H. P. KRAFT.
DUST CAP FOR TIRE VALVES OR THE LIKE.
APPLICATION FILED DEC. 17, 1914.

1,201,199.

Patented Oct. 10, 1916.

WITNESSES:

INVENTOR:
Henry P. Kraft,
By Attorneys,

UNITED STATES PATENT OFFICE.

HENRY P. KRAFT, OF RIDGEWOOD, NEW JERSEY.

DUST-CAP FOR TIRE-VALVES OR THE LIKE.

1,201,199.   Specification of Letters Patent.   Patented Oct. 10, 1916.

Application filed December 17, 1914. Serial No. 877,794.

*To all whom it may concern:*

Be it known that I, HENRY P. KRAFT, a citizen of the United States of America, residing in Ridgewood, in the county of Bergen and State of New Jersey, have invented certain new and useful Improvements in Dust-Caps for Tire-Valves or the like, of which the following is a specification.

This invention relates to dust caps for tire valves or the like, and aims to provide certain improvements therein.

In the use of tire valves the valve commonly projects inwardly through the rim, and it is usual to provide a dust cap which screws over the projecting end of the valve for the purpose of protecting it from dust, injury, etc. The valve is usually screw-threaded throughout its length, and the dust cap usually screws down over the valve. Various constructions have been proposed for avoiding the long screwing operation which is necessary when the dust cap is applied directly to the valve. Among other constructions it has been proposed to screw-thread the rim nut which clamps the valve in place, and to screw the cap upon the nut. In such constructions, however, unscrewing the cap is apt to loosen the nut.

According to the present invention I provide a dust cap which is adapted to screw upon a part which is non-rotatively connected to the valve so that the operation of screwing and unscrewing the cap has no effect upon the rim nut. Preferably such part comprises a collar which is formed with a flattened slot designed to engage the flats of the tire valve. Such collar is by preference swiveled to the rim nut on the outer side thereof, so that it is held against sliding outwardly along the valve.

The invention also includes other features of improvement which will be hereinafter more fully described.

Figure 1:
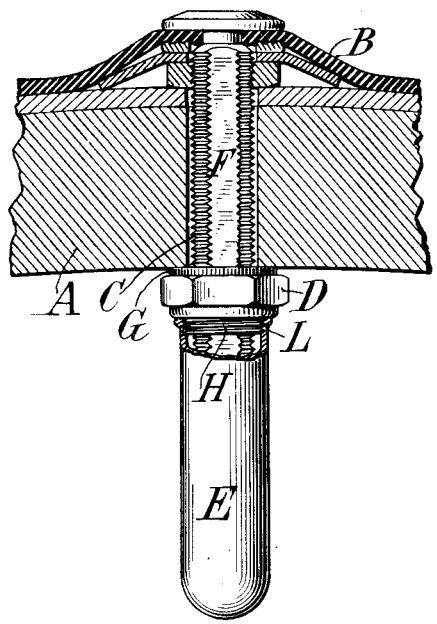
Figure 2:
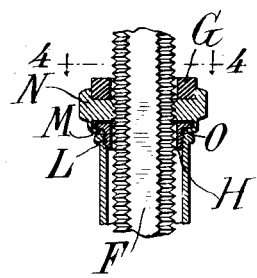
Figure 3:
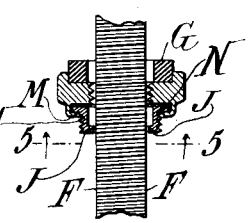
Figure 4:
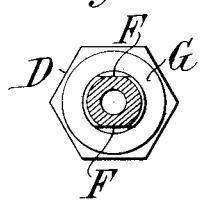
Figure 5:
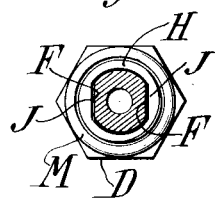
Figure 6:
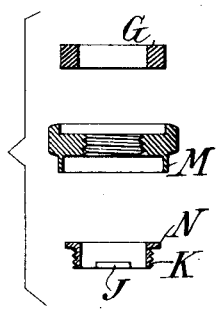
Figure 7:
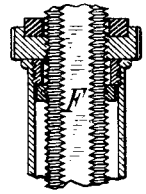

Referring to the drawings which illustrate one form of the invention, Figure 1 is a sectional view of a rim and tube, showing the valve and dust cap in elevation, the foot of the dust cap being partly broken away. Fig. 2 is a sectional view of the foot of the cap. Fig. 3 is a similar view of the rim nut and collar, the parts being shown at right angles to Fig. 2. Fig. 4 is a section on the line 4—4, in Fig. 2. Fig. 5 is a section on the line 5—5 in Fig. 3. Fig. 6 is a sectional view of the parts of the rim nut and collar before assemblage. Fig. 7 is a view of a modification.

Referring to the drawings, let A indicate the felly of a wheel, B the inner tube of a tire, C the valve, D the rim nut, and E the dust cap. The valve C is formed with the flat portions F at each side thereof, as is customary with the Schrader and other forms of valve.

The rim nut D is threaded on its interior and is adapted to be screwed along the valve until it reaches the rim A, thus clamping the valve securely in position. The nut D is not ordinarily disturbed unless it is desired to remove the inner tube. It is customarily provided with a washer G which bears against the inner side of the felly.

According to the present invention the dust cap E is not designed to screw upon the valve or rim nut, but is adapted to engage a collar H which, as best shown in Fig. 5, is formed with an elongated slot, the flat portions J of which are adapted to engage the flats F of the valve. A non-rotative connection is thus secured between the collar and the valve. The collar is screw-threaded to receive the cap, and in the construction shown this screw-thread is formed on a flange K extending axially of the collar, the cap being interiorly threaded as shown at L to engage the flange. This arrangement may be reversed if desired, or the thread may be formed on any other part of the collar.

It is necessary to provide some means for preventing longitudinal displacement of the collar along the valve. To this end the collar may be arranged between the rim nut and the felly, and the rim nut reduced in diameter, so that the cap fits over it, as set forth in an application filed herewith, Serial No. 877793 or a common nut may be provided at the rear of the collar, as shown in Fig. 7, which nut may be swiveled to the collar, or separate therefrom. I prefer, however, the construction illustrated in Figs. 1 to 6, wherein the collar is swiveled to the rim nut D. This may be done by complementary flanges, such as M and N formed on the nut and collar respectively. When the nut is screwed down in place, the collar slides along the valve until the nut is properly adjusted, whereupon the dust cap may be screwed onto or off the collar without difficulty. During such screwing and unscrewing movements the collar, of course, is held against rotation, so that there is no tendency to disturb the rim nut. Preferably the extreme foot O of the cap bears against the flange M of the nut, so that the parts are tightened in position when the cap is screwed home, thus avoiding any looseness or rattling.

By the construction thus described a few turns of the cap are sufficient to apply the dust cap or remove it. At the same time the connection is secure, and does not disturb the other parts. The connection between the dust cap and collar need not necessarily be a screw-threaded one, since any inter-engaging means are sufficient. While the invention has been described in connection with dust caps, it may be applied to other analogous devices.

While I have shown and described several embodiments of the invention, it is to be understood that I do not wish to be limited thereto, as various changes may be made therein without departing from the invention.

What I claim is:—

1. The combination of a valve, a dust cap, and a part formed separately from the valve and having a non-rotative connection therewith, said part and dust cap having detachable engaging means.

2. The combination of a valve, a dust cap, and a collar having a non-rotative connection with the valve, said collar and dust cap having detachable engaging means.

3. The combination of a valve, a dust cap, a collar having a non-rotative connection with the valve, and means for holding said collar in place upon the valve, said dust cap and collar having detachable inter-engaging means.

4. The combination of a valve, a dust cap having a screw-thread, and a collar having a non-rotative connection with the valve, said collar being threaded to engage the cap, and means for holding the collar in place on the valve.

5. The combination of a valve, a screw-threaded collar having a non-rotative connection with the valve, a nut adapted to hold the collar against longitudinal displacement, and a cap adapted to engage the collar.

6. The combination of a dust cap, a rim nut, and a part formed separately from the rim nut and adapted to detachably engage the dust cap.

7. The combination of a dust cap, a part adapted to be detachably engaged by the dust cap, said part having means for non-rotatively engaging a valve.

8. The combination with a valve, a rim nut, a collar formed separately from the rim nut but connected therewith, of a cap adapted to detachably engage said collar.

9. The combination of a rim nut, a collar swiveled thereto, and a dust cap adapted to engage said collar.

10. The combination of a rim nut, a collar swiveled thereto, adapted to non-rotatively engage a valve, and a dust cap adapted to screw on said collar.

11. The combination of a rim nut, a collar swiveled to said rim nut at its outer side, said collar having an oblong opening adapted to fit over a valve, and having a screw-threaded portion, and a dust cap having a screw-threaded portion adapted to engage said collar.

12. For valves or the like the combination of a part formed separately from the valve and rim nut, means for holding said part in definite position on a valve and a dust cap of larger internal diameter than the valve and adapted to slip over the same, said part and dust cap having detachable interengaging means.

13. For valves or the like the combination of a part formed separately from the valve and rim nut, said part adapted to form a non-rotative connection with the valve, means for holding said part in definite position on the valve, and a dust cap of larger internal diameter than the valve so as to slip over the same, said part and dust cap having detachable interengaging means.

In witness whereof, I have hereunto signed my name in the presence of two subscribing witnesses.

HENRY P. KRAFT.

Witnesses:
 E. V. MYERS,
 FRED WHITE.